(12) United States Patent
Mathis

(10) Patent No.: US 7,980,793 B2
(45) Date of Patent: Jul. 19, 2011

(54) CONCENTRIC CLAMPING FOR DRILL SPINDLES

(75) Inventor: Dennis R. Mathis, St. Peters, MO (US)

(73) Assignee: The Boeing Company, Chicago, IL (US)

( * ) Notice: Subject to any disclaimer, the term of this patent is extended or adjusted under 35 U.S.C. 154(b) by 1094 days.

(21) Appl. No.: 11/690,783

(22) Filed: Mar. 23, 2007

(65) Prior Publication Data

US 2008/0232913 A1    Sep. 25, 2008

(51) Int. Cl.
*B23B 35/00*    (2006.01)

(52) U.S. Cl. ............ 408/1 R; 408/97; 408/103; 408/130

(58) Field of Classification Search .................. 408/1 R, 408/67, 95, 97, 98, 103, 124, 129, 130, 234
See application file for complete search history.

(56) References Cited

U.S. PATENT DOCUMENTS

| | | | | | |
|---|---|---|---|---|---|
| 2,339,324 | A | * | 1/1944 | Fischer | 408/56 |
| 3,617,141 | A | * | 11/1971 | Sullivan | 408/35 |
| 4,420,685 | A | * | 12/1983 | Ohtani et al. | 250/222.2 |
| 4,997,319 | A | * | 3/1991 | Arai et al. | 408/17 |
| 5,024,562 | A | * | 6/1991 | Arai et al. | 408/1 R |
| 5,356,245 | A | * | 10/1994 | Hosoi et al. | 408/56 |
| 2008/0232914 | A1 | | 9/2008 | Mathis | |

* cited by examiner

*Primary Examiner* — Daniel W Howell
(74) *Attorney, Agent, or Firm* — Caven & Aghevli LLC

(57) ABSTRACT

Methods and systems for concentric clamping for manufacturing assemblies are disclosed. In one embodiment, a drilling assembly includes a spindle assembly configured to perform a drilling operation at a drilling location on a workpiece, and a clamping assembly having an actuator concentrically disposed about the spindle assembly. A nosepiece is coupled to the actuator and is configured to apply a clamping force concentrically about the drilling location on the workpiece. The actuator may include an inner housing having an outwardly extending flange, and an outer housing disposed about the flange of the inner housing. Pressurization of a first chamber moves the inner housing forwardly and applies the clamping force of the nosepiece against the workpiece, and pressurization of a second chamber moves the inner housing aftwardly and retracts the nosepiece away from the workpiece.

16 Claims, 6 Drawing Sheets

CONCENTRIC CLAMPING FOR DRILL SPINDLES

CROSS REFERENCE TO RELATED APPLICATIONS

This patent application is related to and claims priority to commonly-owned U.S. patent application Ser. No. 11/690,793 entitled "Drill Spindles with Inline Direct Drive Feed" filed on Mar. 23$^{rd}$, 2007, which application is incorporated herein by reference.

FIELD OF THE INVENTION

The field of the present disclosure relates to clamping assemblies for drilling equipment, and more specifically, to methods and systems for concentric clamping for drill spindles.

BACKGROUND OF THE INVENTION

When drilling single or multi-layer stacks, a favored method of stabilizing the drill spindle and workpiece is to press an independently actuated device extending forward of a drill spindle, known as a nosepiece or pressure foot, onto the workpiece surface. Applying this clamping force to multi-layers stacks reduces or eliminates interlaminar burrs from the drilling operation, and prevents drill chips from getting between the layers of materials, which could lead to the holes not lining up after the debris is removed.

Typically, the nosepiece extends beyond the drill tool when the drill tool is retracted. During the actual hole drilling operation, an independent spindle quill with a rotating tool is translated beyond the nosepiece plane.

For hand drilling and some machine drilling applications, a great number of clamping devices, such as Clecos, may be used to apply a squeeze to the stack every few inches. Alternately, external devices such as linear actuators or pneumatic cylinders may be used to apply force to the spindle nosepiece. The external devices are mounted on pairs on opposite sides of the spindle to apply balanced forces, or heavy structures are required to use a single offset device.

These external actuators add significant bulk to the spindle and reduce workpiece accessibility. The actuators and support structures also add weight to the drill spindle. Thus, although desirable results have been achieved using clamping mechanisms in accordance with the prior art, novel systems that are lighter and less bulky would have greater utility.

SUMMARY

Concentric clamping assemblies for drilling equipment in accordance with the present disclosure may advantageously provide improved clamping using assemblies that are lighter and less bulky than comparable prior art systems.

In one embodiment, a drilling assembly includes a spindle assembly configured to perform a drilling operation at a drilling location on a workpiece. The assembly also includes a clamping assembly having an actuator concentrically disposed about the spindle assembly. A nosepiece is coupled to the actuator and is configured to apply a clamping force concentrically about the drilling location on the workpiece. In further embodiments, the actuator includes an inner housing disposed about the spindle assembly and having an outwardly extending flange, and an outer housing disposed about the flange of the inner housing. The inner and outer housings cooperatively form a first chamber on a first side of the flange, and a second chamber on the other side of the flange. Pressurization of the first chamber moves the inner housing forwardly and applies the clamping force of the nosepiece against the workpiece, and pressurization of the second chamber moves the inner housing aftwardly and retracts the nosepiece away from the workpiece.

In another embodiment, a system includes a support structure configured to be positioned proximate a workpiece, a carriage moveably coupled to the support structure, and a head assembly coupled to the carriage. The head assembly includes a tool assembly configured to perform a manufacturing operation at a work location on the workpiece, and a clamping assembly having an actuator concentrically disposed about the tool assembly, and a nosepiece coupled to the actuator and configured to apply a clamping force concentrically about the work location on the workpiece.

In yet another embodiment, a method of performing a drilling operation includes providing a spindle assembly configured to perform a drilling operation at a drilling location on a workpiece; providing a clamping assembly having an actuator concentrically disposed about the spindle assembly, and a nosepiece coupled to the actuator and configured to apply a clamping force concentrically about the drilling location on the workpiece; applying the clamping force concentrically about the drilling location on the workpiece; and while maintaining the clamping force concentrically about the drilling location, performing the drilling operation at the drilling location on the workpiece using the spindle assembly.

The features, functions, and advantages that have been discussed can be achieved independently in various embodiments of the present invention or may be combined in yet other embodiments further details of which can be seen with reference to the following description and drawings.

BRIEF DESCRIPTION OF THE DRAWINGS

Embodiments of systems and methods in accordance with the teachings of the present disclosure are described in detail below with reference to the following drawings.

DETAILED DESCRIPTION

The present disclosure teaches clamping assemblies for drilling equipment, and more specifically, methods and systems for concentric clamping for drill spindles. Many specific details of certain embodiments of the invention are set forth in the following description and in FIGS. 1-10 to provide a thorough understanding of such embodiments. One skilled in the art, however, will understand that the invention may have additional embodiments, or that the invention may be practiced without several of the details described in the following description.

Figure 1:
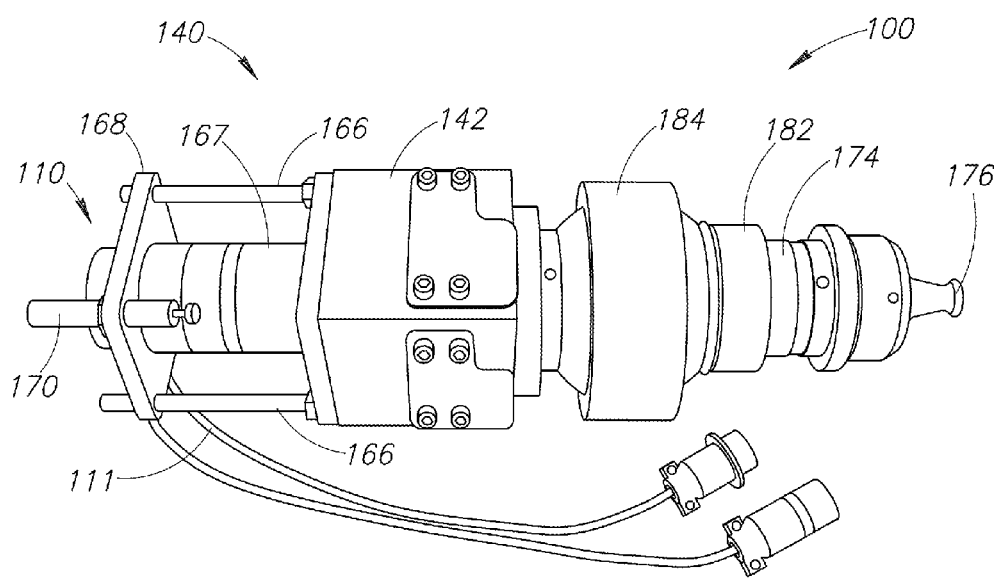
FIG. 1 is a side elevational view of a drill assembly in accordance with an embodiment of the invention.
Figure 2:
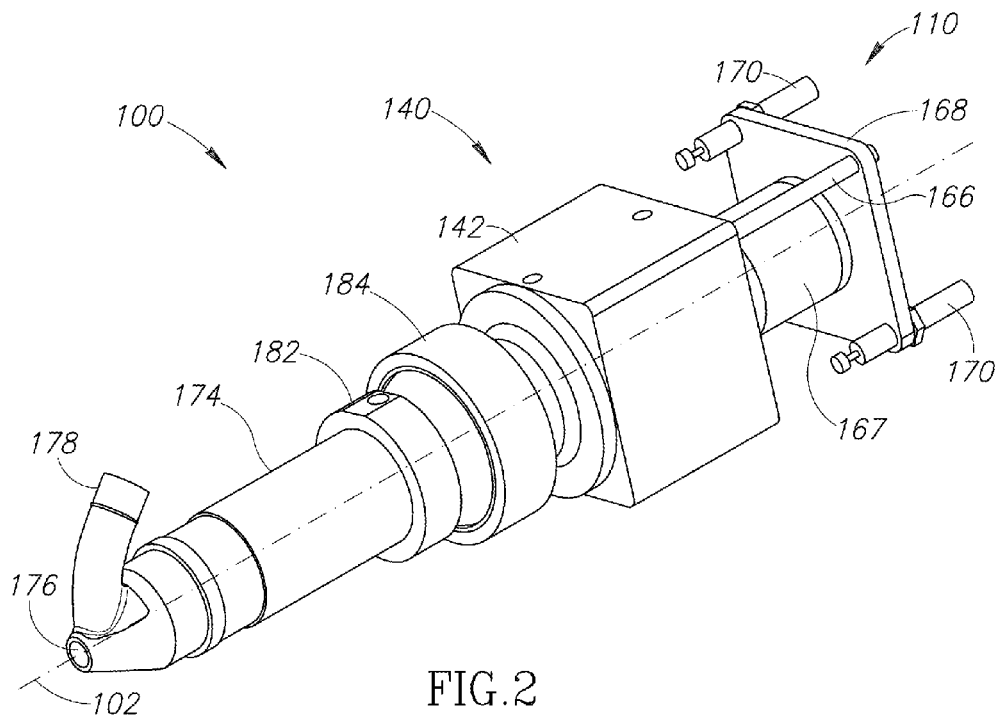
FIG. 2 is an isometric view of the drill assembly of FIG. 1.

FIGS. 1 and 2 are elevational and isometric views of a drill assembly 100 in accordance with an embodiment of the invention. In this embodiment, the drill assembly 100 includes a spindle assembly 110 that performs the actual drilling operations on a workpiece, and a clamping assembly 140 that clamps and secures the workpiece during the drilling operations performed by the spindle assembly 110. The spindle assembly 110 may be of a type known in the art as a "quill" spindle assembly, and is approximately centrally-disposed along a drilling axis 102. As described below, the clamping assembly 140 is concentrically disposed about, and integrated with, the spindle assembly 110 to perform the desired clamping of the workpiece in a compact, lightweight configuration.

General Overview

Figure 3:
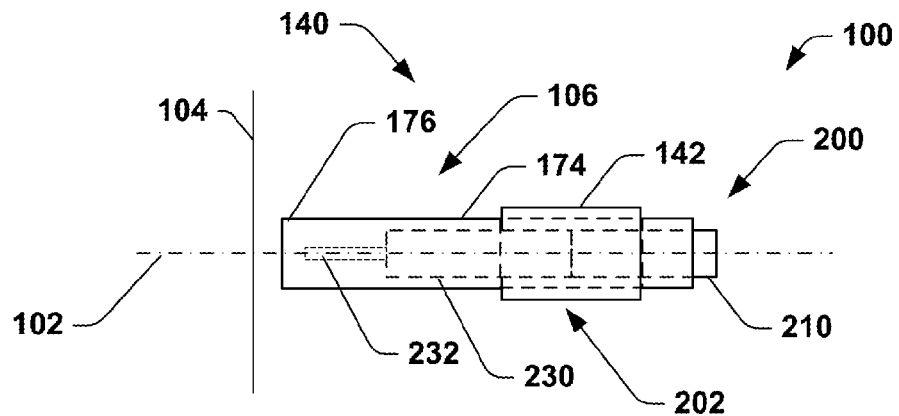
FIG. 3 is a side schematic representation of the drill assembly of FIG. 1 positioned proximate a workpiece.
Figure 4:
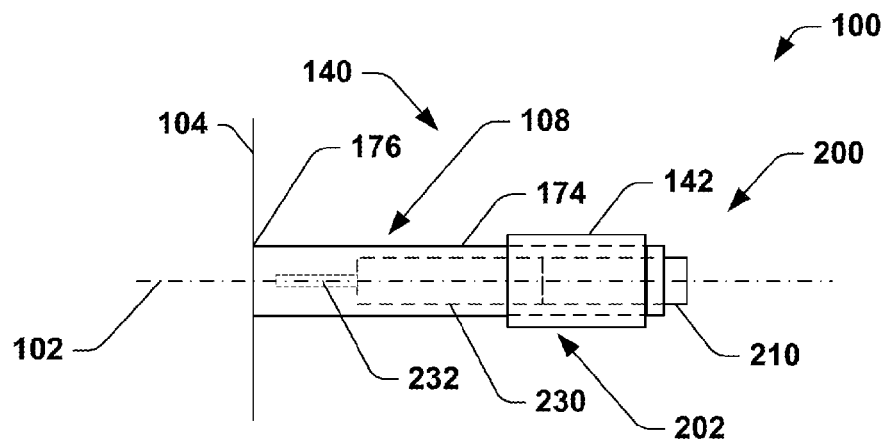
FIG. 4 is a side schematic representation of the drill assembly of FIG. 1 with a clamping assembly engaged with the workpiece.
Figure 5:
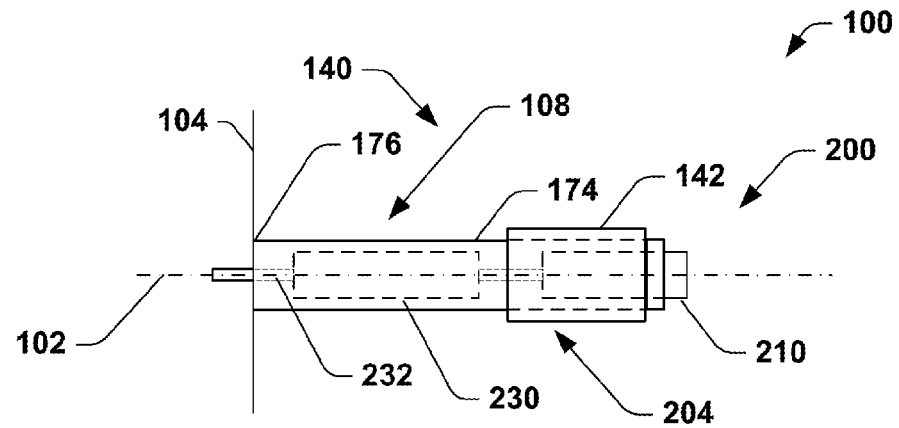
FIG. 5 is a side schematic representation of the drill assembly of FIG. 1 with the clamping assembly and a spindle assembly engaged with the workpiece.

To provide a conceptual understanding of the primary components and broad operational aspects of the drill assembly 100, and to set the stage for a more detailed description provided below, several basic aspects of the drill assembly 100 will be described with reference to FIGS. 3 through 6. More specifically, FIG. 3 shows a side schematic representation of the drill assembly 100 of FIG. 1. In this embodiment, the clamping assembly 140 includes a main housing 142 concentrically disposed about the spindle assembly 200, and an extension housing 174 that projects forwardly from the main housing 142 toward a workpiece 104. A nosepiece (or pressure foot) 176 may be positioned on the forward end of the extension housing 174. The spindle assembly 200 includes a feed unit 210 operatively coupled to a spindle unit 230. A manufacturing tool 232, such as a drill bit, is coupled to the spindle unit 230. In FIGS. 3 through 5, it will be appreciated that the components of the drilling assembly 100 are not drawn to scale, and portions of the spindle assembly 200 that are disposed within the clamping assembly 140 are shown in dotted lines.

Figure 6:
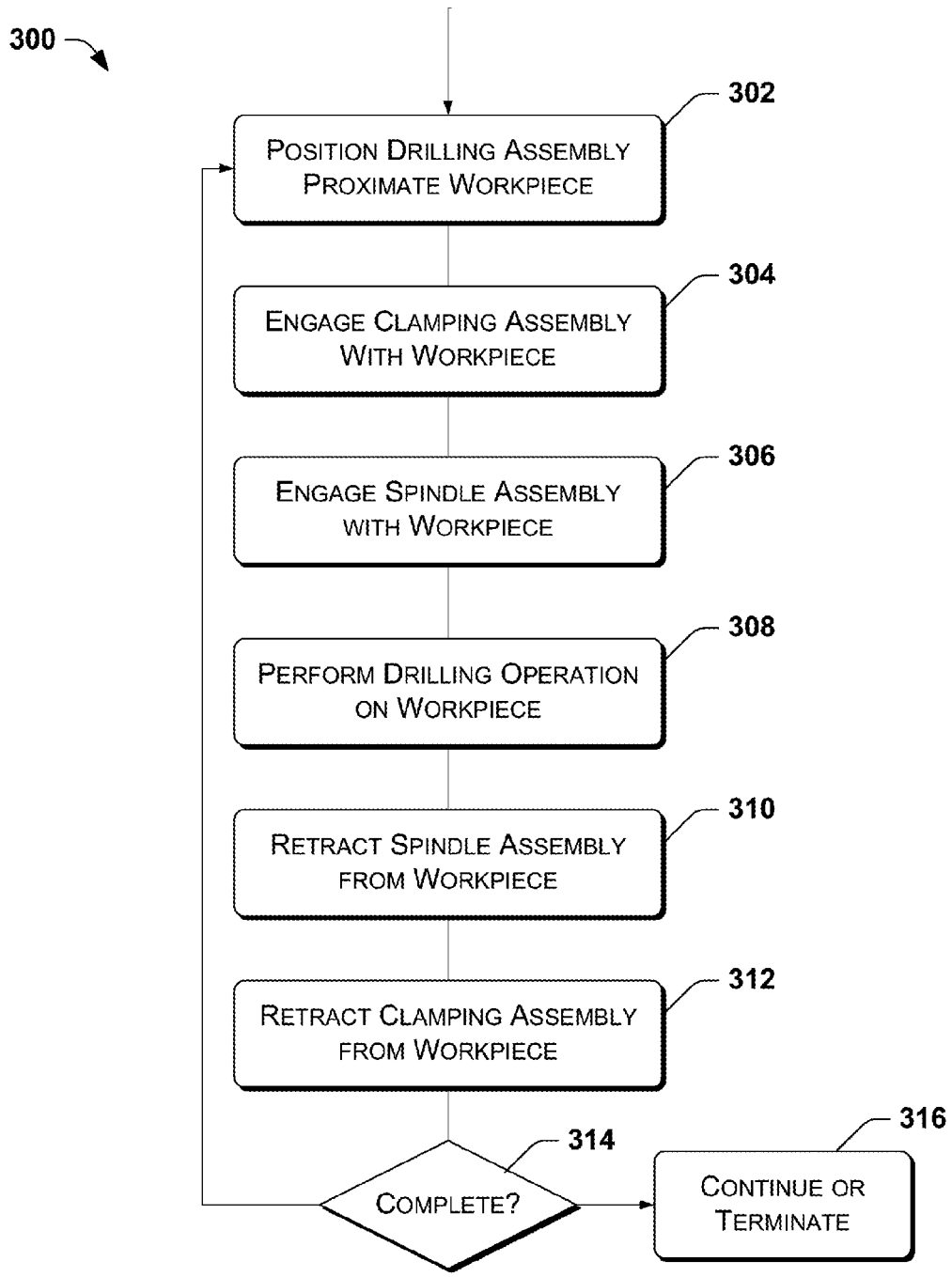
FIG. 6 is a flow chart of a method of performing drilling operations in accordance with an alternate embodiment of the invention.

FIG. 6 is a flow chart of a method 300 of performing drilling operations in accordance with a further embodiment of the invention. The method 300 is illustrated as a collection of blocks in a logical flow graph, which represents a sequence of operations that can be implemented in hardware, manual operations, software-controlled or automated operations, or a combination thereof. In the context of software-controlled and automated operations, the blocks represent computer instructions that, when executed by one or more processors, perform the recited operations. For discussion purposes, the method 300 is described with reference to the drilling assembly 100 shown in FIGS. 1 through 5.

With reference to FIG. 6, the method 300 of performing a drilling operation may begin at 302 by positioning the drilling assembly 100 proximate the workpiece 104. In this position (FIG. 3), the extension housing 174 of the clamping assembly 140 may be in a retracted position 106, and the spindle unit 230 of the spindle assembly 200 may also be in a retracted position 202.

At 304, the clamping assembly 140 may be actuated to an extended position 108 (as shown in FIG. 4) by moving the extension housing 174 forwardly along the drilling axis 102 until the nosepiece 176 engages the workpiece 104. In this position, the clamping assembly 140 may apply a clamping force to the workpiece 104 while the spindle assembly 200 translates forward with the extension housing 174, but remains in the retracted position 202. Applying the clamping force may secure and stabilize the spindle assembly 200 and the workpiece 104 during the drilling operation, and for multi-layer workpieces, may advantageously reduce or eliminate interlaminar burrs and prevent drill chips from getting between the layers of materials.

The feed unit 210 of the spindle assembly 200 is actuated to advance the spindle unit 230 along the drilling axis 102 to an extended position 204 until the drill bit 232 engages the workpiece 104 at 306. At 308, the spindle unit 330 is actuated to rotate the drill bit 232, thereby performing the drilling operation on the workpiece 104, as shown in FIG. 5. A rectangular key 239 attached to spindle unit 230 slides in a keyway 175 in the extension housing 174 (FIGS. 7 and 8), counteracting the drill torque and preventing rotation of the spindle unit 230 relative to the extension housing 174. Upon completion of the drilling operation, the spindle assembly 200 may be withdrawn to the retracted position 202 at 310, and the clamping assembly 140 may be withdrawn to the retraction position 108 at 312. At 314, the method 300 determines whether drilling operations are complete. If not, the method 300 returns to positioning the drilling assembly at the next desired location on the workpiece 104, and the above-reference actions may be repeated to perform additional drilling operations. If drilling operations are determined to be completed at 314, then the method 300 may terminate or continue to other aspects of the manufacturing operations at 316.

Concentric Clamping Assembly Embodiment

Having provided a general overview of the primary components and broad operational aspects of the drill assembly 100, additional specific details and operational aspects of the drill assembly 100 will now be provided. More specifically, FIGS. 7 and 8 are cross sectional views of the drill assembly 100 with the clamping assembly 140 in retracted and extended positions 106, 108, respectively.

In this embodiment, the spindle assembly 110 includes a feed motor 112 configured to drive (i.e. extend and retract) a drill motor 114 along the drilling axis 102. The drill motor 114 is an elongated assembly that includes a collection of individual components, and generally extends from a first end 113 proximate the feed motor 112 to a second end 115 proximate a workpiece 104 (FIG. 7). A drill bit 116 is coupled to the second end of the drill motor 114 for drilling holes in the workpiece 104. Additional details and aspects of the spindle assembly 110 are described in the above-referenced, previously-incorporated U.S. patent application Ser. No. 11/690, 793 entitled "Drill Spindles with Inline Direct Drive Feed".

Figure 7:
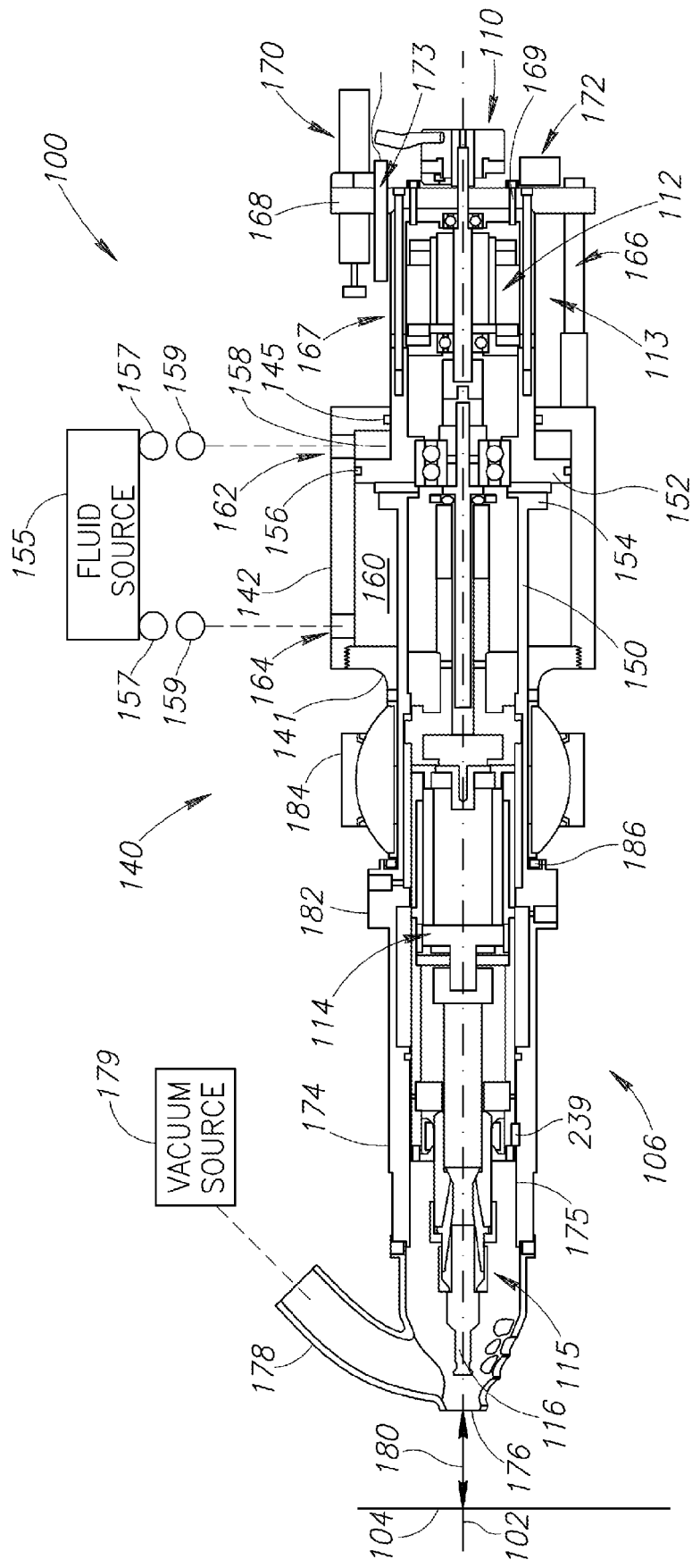
FIG. 7 is a side cross sectional view of the drill assembly of FIG. 1 in a retracted position.
Figure 8:
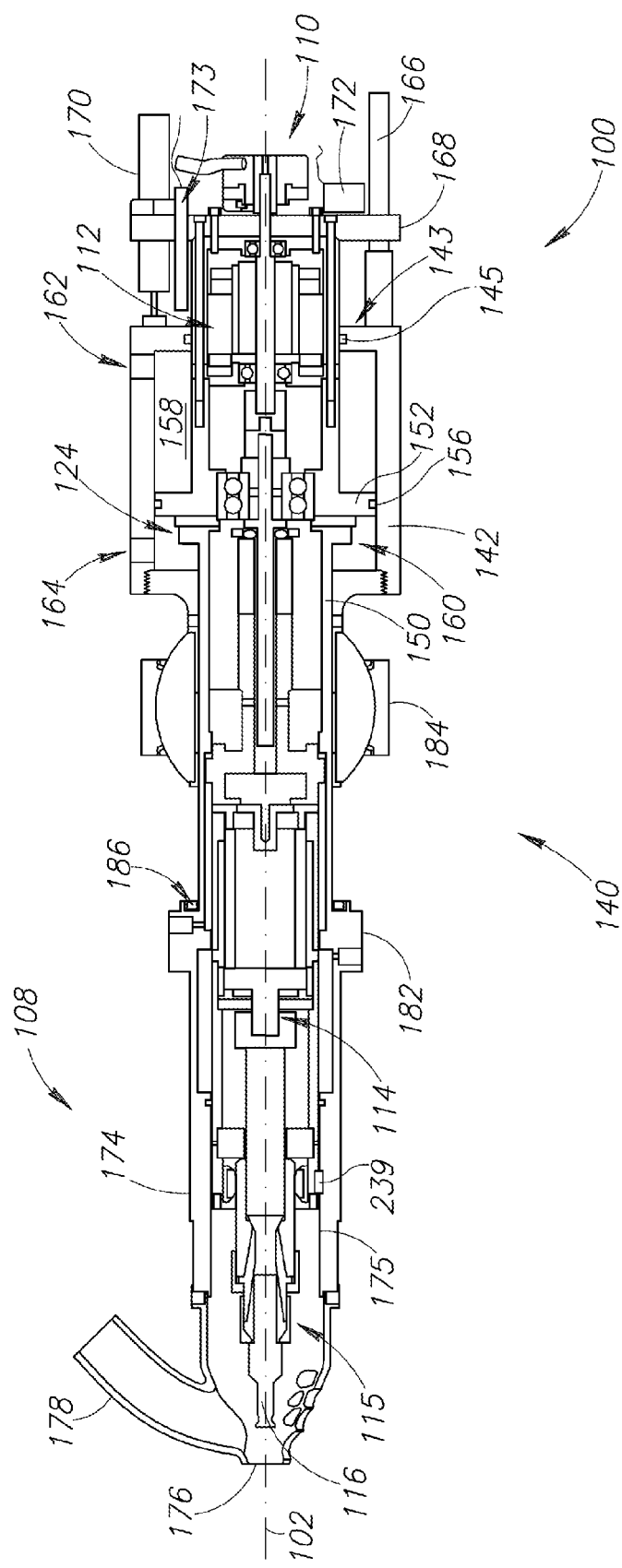
FIG. 8 is a side cross sectional view of the drill assembly of FIG. 1 in an extended position.

With reference to FIGS. 7 and 8, in this embodiment, the clamping assembly 140 includes a main housing 142 slideably disposed about a flanged portion 152 of a spindle housing 150. An abutment housing (or spherical bearing) 184 is coupled to a forward end 141 of the main housing 142. In this embodiment, the spindle housing 150 includes a forward travel stop 154 that abuts the forward end 141 of the main housing 142 in the extended position 108, and a seal 156 is disposed about a peripheral edge of the flanged portion 152. In some embodiments, the seal 156 may be a low-friction O-ring seal with groove dimensions conforming to design recommendations for a dynamic "floating" seal design by Parker Hannifin Corp. of Lexington, Ky.

The main housing 142 and the spindle housing 150 cooperatively form an extension chamber 158 on one side of the flanged portion 152, and a retraction chamber 160 on the other side of the flanged portion 152. An extension port 162 extends through the main housing 142 and fluidly communicates with the extension chamber 158. Similarly, a retraction port 164 extends through the main housing 142 and fluidly communicates with the retraction chamber 160. As shown in FIG. 7, a source of pressurized fluid 155 may be coupled to the extension port 162, and in alternate embodiments, may also be coupled to the retraction port 164. A valve 157 controls the flow of pressurized fluid (e.g. air, hydraulic fluid, or other suitable fluid medium) into and out of the extension port 162 (and in some embodiments, the retraction port 164).

In this embodiment, guide rods 166 extend rearwardly from the main housing 142, and a base 168 is slideably coupled to the guide rods 166. The base 168 is also coupled to the spindle assembly 110 so that as the base 168 slides along the guide rods 166, the spindle housing 150 slides within the main housing 142 along the drilling axis 102. A covering 167, such as a low friction synthetic covering, may be disposed about the first end 113 of the spindle housing 150 so that as an aft end 143 of the main housing 142 slides along the spindle housing 150, a housing seal 145 slides over the covering 167 to prevent damage and ensure a proper seal of the extension chamber 158.

Also, in some embodiments, shock absorbers 170 may be mounted on the base 168. As shown in FIG. 8, the shock absorbers 170 may be configured to engage the aft end 143 of the main housing 142 when the drill assembly 100 is positioned in the extended position 108. A retract position sensor 172 is coupled to the base 168 and detects the presence (or absence) of a guide rod 169 to determine whether the drilling assembly 100 is in the retracted position 106. Similarly, an extend position sensor 173 is coupled to the base 164 and detects whether the drilling assembly 100 is in the extended position 108.

With continued reference to FIGS. 7 and 8, an extension housing 174 extends forwardly from the spindle housing 150, and a nosepiece 176 is coupled to an end of the extension housing 174. In this embodiment, the nosepiece 176 includes a vacuum port 178 that may be coupled to a vacuum source 179 so that extraneous materials produced by the drilling operations may be readily evacuated. In the extended position 108 (FIG. 8), the nosepiece 176 clampably engages the workpiece 104. In the retracted position 106 (FIG. 7), the nosepiece 176 is disengaged from the workpiece 104 by a travel distance (or stroke) 180 until an outwardly projecting flange portion 182 of the extension housing 174 abuts against the abutment housing 184. In some embodiments, a retract O ring 186 is disposed within an aft edge of the flange portion 182. As the extension housing 174 is withdrawn into the retracted position 108 (FIG. 7), the retract O ring 186 may absorb the shock of the impact between the flange portion 182 and the abutment housing 184.

It will be appreciated that drilling assemblies in accordance with the present disclosure may be implemented in a variety of manufacturing systems designed for a wide variety of drilling applications For example, in one particular embodiment, the clamping assembly 140 can apply clamp loads of greater than 500 lbs, and the spindle assembly 110 can exert a drill thrust greater than 400 lbs. In further embodiments, the entire drilling assembly 100 may be 4.5 inches square and 22 inches long, and may weigh less than 20 lbs. Typical prior art systems with the same load capacity are more than approximately 5 times the weight and size of this design. Using embodiments of the present invention, the complexity and number of parts may be reduced. Also, embodiments of the invention may be less susceptible to contamination of mating surfaces resulting in countersink depth errors than competing prior art systems with independently actuated nose pieces.

Figure 9:
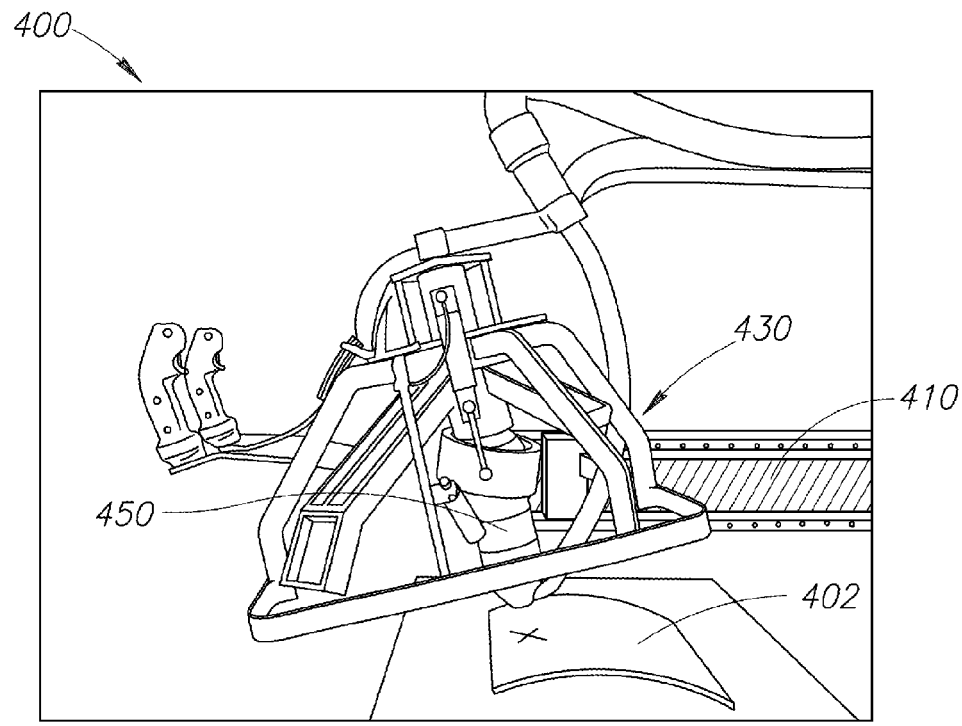
FIGS. 9 and 10 are side elevational views of a drilling system including a drill assembly in accordance with another embodiment of the invention.
Figure 10:
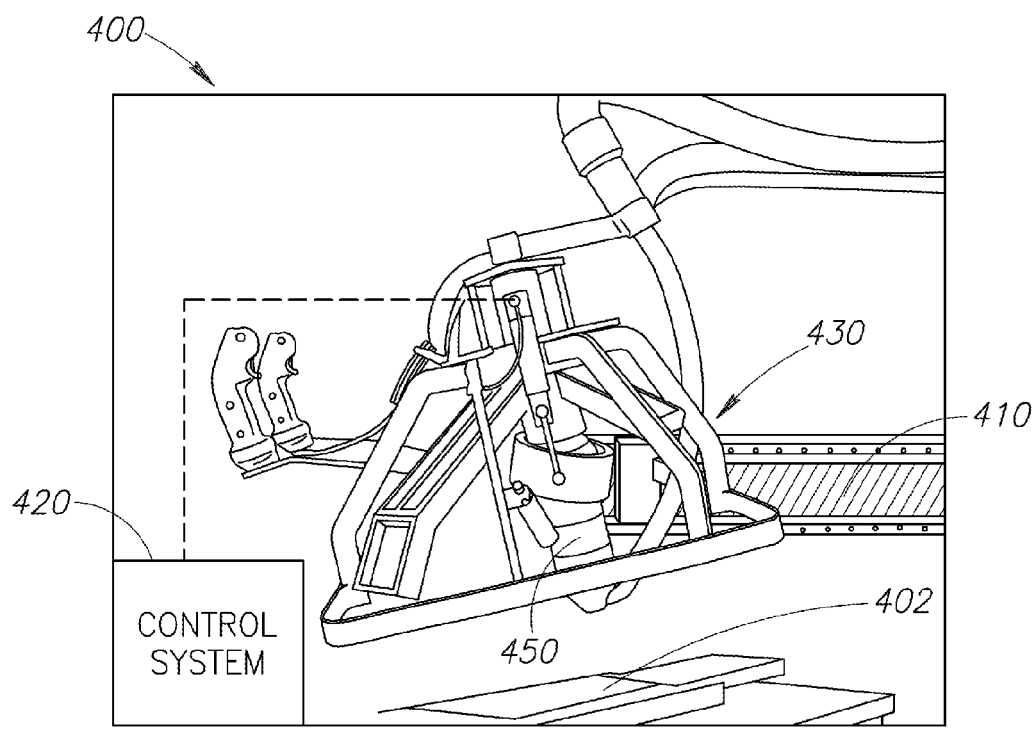

Embodiments of the present invention may also be integrated into existing automated drilling systems of the type that may be used for components and assemblies of commercial vehicles, including aircraft, consumer products, industrial products, and any other desired manufactured products or structures. For example, FIGS. 9 and 10 are side elevational views of a drilling system 400 in accordance with another embodiment of the invention. In this embodiment, the drilling system 400 includes a support structure 410 positioned over a workpiece 402, and a carriage 430 moveably coupled to the support structure 410. A drilling assembly 450 of the type disclosed herein, such as the drilling assembly 100 described above with reference to FIGS. 1-8, is operatively coupled to the carriage 430 for performing manufacturing operations on the workpiece 402. A control system 420 is coupled to the carriage 430 (and possibly also the support structure 410) provides multi-dimensional, multi-degree of freedom control (e.g. six degree of freedom) control of the position and orientation of the drilling assembly 450 with respect to the workpiece 402. Unless otherwise specified below, the structure and operational aspects of the support structure 410, the control system 420, and the carriage 430 are generally known, and for the sake of brevity, will not be described in detail herein. In some embodiments, these components (support structure 410, control system 420, carriage 430, and other components of the system 400 other than the drilling assembly 450) may be of a type generally disclosed in co-pending, commonly-owned U.S. Application No. 2006/0104734 A1 by Mathis et al., incorporated herein by reference.

Referring again to the exemplary method 300 of performing drilling operations shown in FIG. 6, further embodiments of the method 300 will now be described in greater detail with reference to the components shown in FIGS. 7-10. More specifically, at 302, with the drilling assembly 100 in the retracted position 106 (FIG. 7), the drilling assembly 100 is positioned in a desired position proximate a workpiece 104. In some embodiments, this may be accomplished using the position control components (e.g. support structure 410, control system 420, carriage 430, etc.) of the drilling system 400.

The clamping assembly 140 of the drilling assembly 100 is engaged with the workpiece at 304. More specifically, a pressurized fluid may be introduced into the extension chamber 158, creating a higher pressure within the extension chamber 158 than in the retraction chamber 160. The resultant force differential across the flange 152 (FIG. 7) drives the spindle housing 150 along the drilling axis 102 toward the workpiece 104, and also driving the extension housing 174 and the nosepiece 176 along the drilling axis 102 until the nosepiece 176 clampably engages the workpiece 104. As the flange 152 moves forwardly along the drilling axis 102, fluid (e.g. air) within the retraction chamber 160 is expelled out of the main housing 142 through the retraction port 164. For example, in the case of pneumatic systems, the retraction port 164 may simply be vented to the atmosphere surrounding the drilling assembly 100 during the pressurization of the extension chamber 158. Alternately, the retraction port 164 may be vented to a suitable fluid reservoir. In the event that the workpiece 104 is beyond the travel distance 180 of the spindle housing 150, the forward stop 154 of the spindle housing 150 may engage with the forward end 141 of the main housing 142, ensuring that the flange 152 does not block the retraction port 164 and prevent retraction of the spindle housing 142 or damage seal 156.

In some embodiments, the pressurization of the extension chamber 158 may be precisely controlled during the time of travel of the spindle housing 150 within the main housing 142. For example, the pressure within the extension chamber 158 may initially be increased to a lower value in order to limit acceleration of the spindle housing 150, the extension housing 174, and the nosepiece 176 toward the workpiece 104. This may be desirable in order to reduce the velocity of the nosepiece 176 as it traverses the travel distance 180. When the nosepiece 176 nears the workpiece 104, as indicated by the extend position sensor 173 or by elapsed time, the pressure within the extension housing 174 may be increased so that the moving components (e.g. spindle housing 150, extension housing 174, and nosepiece 176) may apply the full intended force to the nosepiece 176 contacting the workpiece 104.

For example, the controlling of the pressure within the extension chamber 158 may be accomplished using a suitable control system (e.g. controller 420) coupled to one or more proportional valves 159 that regulate the fluid pressure from the fluid source 155, and/or a directional valve (e.g. valve 157) that controls the fluid flow from the fluid source 155. In further embodiments, the flow of fluid from the retraction port 164 may also be precisely controlled, such as by reducing the rate of flow from the retraction port 164 to decelerate the moving components (e.g. spindle housing 150, extension housing 174, and nosepiece 176) as the nosepiece 176 approaches the workpiece 104. By precisely controlling the pressures within the extension chamber 158 (and possibly also the retraction chamber 160), the impact of the nosepiece 176 on the workpiece 104 may be reduced, thereby reducing or preventing marring or damage to the workpiece 104, and wear and tear on the drilling assembly 100.

As further shown in FIG. 6, the spindle assembly 110 is engaged with the workpiece 104 at 306. For example, with the clamping assembly 140 securely engaged with the workpiece 104, the feed motor 112 (FIG. 7) may be actuated via electric leads 111 (FIG. 1), driving the drill motor 114 and the drill bit 116 forward along the drilling axis 102 toward the workpiece 104. In some embodiments, moving components (e.g. spindle housing 150, extension housing 174, and nosepiece 176) are driven axially at relatively high speeds to reduce manufacturing times. To avoid impacting the nosepiece 176 with the workpiece 104 at an undesirably high speed, the shock absorbers 170 moving forwardly with the base 168 may engage the aft end 143 of the main housing 142 (as shown in FIG. 8), thereby decelerating (or stopping) the travel of the spindle assembly 110 to a suitable speed prior to the engagement of the nosepiece 176 with the workpiece 104.

At 308, a drilling operation is performed on the workpiece 104 using the spindle assembly 110 of the drilling assembly 100. The guide rods 166 serve to prevent rotation of the spindle assembly 110 and react drill torques during the drilling operation. The embodiment shown in FIGS. 1-8 uses two external guide rods 166 attached to the main housing 142 and extending through the base 168. The guide rods 166 are free to permit translation of the spindle assembly 110 but inhibit rotation of the spindle assembly 110 relative to the clamping system 140. In alternate embodiments, a greater number of guide rods 166 may be used, or the guide rods 166 could suffice in many configurations external to or internal to the main housing 142. In further embodiments, the guides can be embodied as structures serving as ways attached to the main housing 142 or the spindle housing 150 with slots on the opposite feature to prevent relative rotation between these components.

During or after the drilling operation, the vacuum source 179 (FIG. 7) may be used to evacuate waste materials produced by the drilling operation. The drill motor 114 and the drill bit 116 may be retracted from the workpiece 104 at 310. This may be accomplished using the feed motor 112 (FIG. 7).

As further shown in FIG. 6, the clamping assembly 140 may be retracted from the workpiece 104 at 312. In some embodiments, this may be accomplished by reducing the pressure within the extension chamber 158 (e.g. using valve 157) and allowing atmospheric pressure within the retraction chamber 160 to drive the spindle housing 150 (and the extension housing 174 and the nosepiece 176) rearwardly along the drilling axis 102.

Alternately, the extension chamber 158 may be vented to atmosphere, and the retraction chamber 160 may be pressurized, such as by using the fluid source 155 coupled to the retraction port 164 via valve 157. During retraction, the pressure within the retraction chamber 160 may be precisely controlled in order to reduce the travel time of the spindle housing 150 within the main housing 142, and also to reduce the impact of the moving components as they reach the fully retracted position 106 (FIG. 7). The retract position sensor 172 may be used to control timing of the retraction operation sequence. As noted above, as the moving components (spindle housing 150, extension housing 174, and nosepiece 176) reach the retracted position 106, the retract O ring 186 disposed within the flange portion 182 of the extension housing 174 is compressed between the flange portion 182 and the abutment housing 184, and may absorb the shock of the impact between the flange portion 182 and the abutment housing 184 during retraction of the clamping assembly 140. In some embodiments, when fully retracted, the O ring 186 seals the forward end of the retraction chamber 160. Alternately, an O ring may be located in the forward end 141 of the main housing 142. Preferably, the O ring seal 186 contributes little or no frictional loads during the extension or retraction of the clamping assembly 140.

At 314, the method 300 determines whether drilling operations are complete. If not, the method 300 returns to positioning the drilling assembly at the next desired location on the workpiece 104, and the above-reference actions may be repeated to perform additional drilling operations. If drilling operations are determined to be completed at 314, then the method 300 may terminate or continue to other aspects of the manufacturing operations at 316.

Embodiments of methods and systems in accordance with the teachings of the present disclosure may provide significant advantages over the prior art. For example, embodiments of the invention may use a single actuator (e.g. main housing 142 and spindle housing 150) that is concentric to and balanced about the spindle assembly 110. Thus, embodiments of the invention may provide an improved or optimal solution for minimizing bulk and weight of the clamping system while improving or maximizing rigidity. Furthermore, the maximum clamp force has no inherent limits and can be easily increased with increasing pressures or increasing the bore diameter. Embodiments of the invention may provide added capabilities of varying clamp force, decelerating the spindle housing, and resisting the torques developed during the drill operation. Thus, embodiments of the invention provide the desired clamping to consolidate the layers of the workpiece to minimize drill burrs and prevent drill chips from getting between layers of material of the workpiece 104 using a lighter, less bulky clamping assembly in comparison with the prior art.

Furthermore, the energy absorption devices integrated into the drilling assembly, such as hydraulic shock absorbers, may permit longer, faster movements of the components, and may be employed to decelerate the spindle assembly 110 to prevent marks or indentions on the workpiece 104 to be drilled. In the embodiment shown in FIGS. 1-8, the shock absorbers 170 are used to decelerate the spindle assembly 110 on extension, and the retract O-ring 186 is used to absorb the shock generated at the end of the spindle assembly retraction. In addition, by precisely controlling the pressure within the extension chamber 158, a reduced pressure during most of the spindle housing travel may be used, and the final clamping pressure (force) may be applied at the end of the spindle assembly travel. These alternate aspects may advantageously reduce wear and tear on the drilling assembly, and associated costs associated with repairs and maintenance.

While specific embodiments of the invention have been illustrated and described herein, as noted above, many changes can be made without departing from the spirit and scope of the invention. Accordingly, the scope of the invention should not be limited by the disclosure of the specific embodiments set forth above. Instead, the invention should be determined entirely by reference to the claims that follow.

What is claimed is:

1. A drilling assembly, comprising:
a spindle assembly configured to perform a drilling operation at a drilling location on a workpiece; and
a clamping assembly having an actuator concentrically disposed about the spindle assembly, and a nosepiece coupled to the actuator and configured to apply a clamping force concentrically about the drilling location on the workpiece, the clamping assembly configured to move together with the spindle assembly, wherein the actuator includes:
an inner housing disposed about the spindle assembly and having an outwardly extending flange; and
an outer housing disposed about the flange of the inner housing, wherein the inner housing and the outer housing cooperatively form a first chamber on a first side of the flange, and a second chamber on the other side of the flange, and wherein pressurization of the first chamber moves the inner housing forwardly and applies the clamping force of the nosepiece against the workpiece, and pressurization of the second chamber moves the inner housing aftwardly and retracts the nosepiece away from the workpiece.

2. A method of performing a drilling operation, comprising:
providing a spindle assembly configured to perform a drilling operation at a drilling location on a workpiece;
providing a clamping assembly having an actuator concentrically disposed about the spindle assembly, and a nosepiece coupled to the actuator and configured to apply a clamping force concentrically about the drilling location on the workpiece;
applying the clamping force concentrically about the drilling location on the workpiece by moving the spindle assembly together with the clamping assembly towards the drilling location on the workpiece; and
while maintaining the clamping force concentrically about the drilling location, performing the drilling operation at the drilling location on the workpiece using the spindle assembly,
wherein providing a clamping assembly includes providing a clamping assembly wherein the actuator includes an inner housing disposed about the spindle assembly and having an outwardly extending flange, and an outer housing disposed about the flange of the inner housing, wherein the inner housing and the outer housing cooperatively form a first chamber on a first side of the flange, and a second chamber on the other side of the flange; and
wherein the inner housing further includes a second flange outwardly extending at an axial location forward of the outer housing, the second flange having a compliant seal member disposed therein, and wherein the method further comprises retracting the clamping assembly away from the workpiece including abutting the seal member against the outer housing.

3. The drilling assembly of claim 1, wherein the inner housing further includes a second flange outwardly extending at an axial location forward of the outer housing, the second flange having a compliant seal member disposed therein, the seal member being configured to abut the outer housing when the clamping assembly is fully retracted away from the workpiece.

4. The drilling assembly of claim 3, wherein the inner housing further includes a forward stop portion disposed between the flange and a forward end of the outer housing, the forward stop portion being configured to prevent the flange from blocking the retraction port disposed within the outer housing.

5. The drilling assembly of claim 1, wherein the inner housing includes an extension portion concentrically disposed about the spindle assembly and extending forward of the outer housing to the nosepiece, and wherein the spindle assembly includes at least one key projecting outwardly into engagement with at least one keyway longitudinally disposed within the extension portion, the engagement of the at least one key with the at least one keyway allowing translation of the spindle assembly with respect to the extension housing along a longitudinal axis, and preventing rotation of the spindle assembly with respect to the extension housing about the longitudinal axis.

6. The drilling assembly of claim 1, wherein the inner housing includes an extension portion concentrically disposed about the spindle assembly and extending forward of the outer housing to the nosepiece, and wherein the extension portion includes an outwardly projecting stop flange that abuts with a forward portion of the outer housing when the nosepiece is fully retracted away from the workpiece.

7. The drilling assembly of claim 6, further comprising a compliant member disposed about the extension portion between the stop flange and the forward portion, the compliant member being compressed between the stop flange and the forward portion when the nosepiece is fully retracted away from the workpiece.

8. The drilling assembly of claim 1, wherein the clamping assembly includes at least one guide rod projecting aftwardly from the outer housing, and wherein the spindle assembly has a first end configured to perform the drilling operation, and a second end opposite from the first end, the spindle assembly further including:
a base positioned proximate the second end and slideably engaged with the at least one guide rod, the base and the at least one guide rod being configured to prevent rotation of the spindle assembly about a longitudinal axis with respect to the outer housing; and
at least one shock absorbing device coupled to the base and configured to engage the outer housing of the clamping assembly to slow a forward movement of the nosepiece as it approaches the workpiece.

9. A system, comprising:
a support structure configured to be positioned proximate a workpiece;
a carriage moveably coupled to the support structure; and
a head assembly coupled to the carriage, the head assembly including:
a tool assembly configured to perform a manufacturing operation at a work location on the workpiece; and
a clamping assembly having an actuator concentrically disposed about the tool assembly, and a nosepiece coupled to the actuator and configured to apply a clamping force concentrically about the work location on the workpiece, the clamping assembly configured to move together with the tool assembly, wherein the actuator includes:
an inner housing disposed about the tool assembly and having an outwardly extending flange; and
an outer housing disposed about the flange of the inner housing, wherein the inner housing and the outer housing cooperatively form a first chamber on a first side of the flange, and a second chamber on the other side of the flange, and wherein pressurization of the first chamber moves the inner housing forwardly and applies the clamping force of the nosepiece against the workpiece, and pressurization of the second chamber moves the inner housing aftwardly and retracts the nosepiece away from the workpiece.

10. The method of claim 2, wherein applying the clamping force includes adjusting at least one pressure within at least one chamber of the actuator to accelerate the nosepiece toward the workpiece, and then as the nosepiece nears the workpiece, readjusting the at least one pressure within the at least one chamber to apply the final clamping force of the nosepiece on the workpiece.

11. The system of claim 9, wherein inner housing further includes a second flange outwardly extending at an axial location forward of the outer housing, the second flange having a compliant seal member disposed therein, the seal member being configured to abut the outer housing when the clamping assembly is fully retracted away from the workpiece.

12. The system of claim 9, wherein the inner housing includes an extension portion concentrically disposed about the spindle assembly and extending forward of the outer housing to the nosepiece, and wherein the extension portion includes an outwardly projecting stop flange that abuts with a forward portion of the outer housing when the nosepiece is fully retracted away from the workpiece.

13. The system of claim 12, further comprising a compliant member disposed about the extension portion between the stop flange and the forward portion, the compliant member being compressed between the stop flange and the forward portion when the nosepiece is fully retracted away from the workpiece.

14. The system of claim 9, further comprising:
a source of pressurized fluid;
a flow control device coupled between the source and at least one of the extension port and the retraction port; and
a controller configured to transmit control signals to the flow control device to control pressures within at least one of the first chamber and the second chamber during movement of the inner housing.

15. The method of claim 2, wherein applying the clamping force includes pressurizing the first chamber to move the inner housing forward.

16. The method of claim 15, further comprising retracting the nosepiece from the workpiece, including pressurizing the second chamber to move the inner housing aftward.

* * * * *